US012613449B2

(12) United States Patent
Mizushima et al.

(10) Patent No.: US 12,613,449 B2
(45) Date of Patent: Apr. 28, 2026

(54) CONTROL APPARATUS, LENS APPARATUS, IMAGE PICKUP APPARATUS, AND CAMERA SYSTEM

(71) Applicant: CANON KABUSHIKI KAISHA, Tokyo (JP)

(72) Inventors: Masayasu Mizushima, Tochigi (JP); Yuichiro Kato, Tochigi (JP); Toshimune Nagano, Saitama (JP); Akino Moriyoshi, Tochigi (JP); Toru Matsumoto, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 441 days.

(21) Appl. No.: 18/182,509

(22) Filed: Mar. 13, 2023

(65) Prior Publication Data

US 2023/0314904 A1 Oct. 5, 2023

(30) Foreign Application Priority Data

Mar. 15, 2022 (JP) ................................. 2022-040691

(51) Int. Cl.
  *G03B 5/00* (2021.01)
  *G03B 5/04* (2021.01)
(52) U.S. Cl.
  CPC ...... *G03B 5/00* (2013.01); *G03B 5/04* (2013.01)
(58) Field of Classification Search
  CPC ....................................................... G03B 5/06
  See application file for complete search history.

(56) References Cited

U.S. PATENT DOCUMENTS

2008/0165272 A1* 7/2008 Toguchi ............... H04N 23/695
                                                        348/E5.045
2015/0234198 A1* 8/2015 Hayakawa ............. G03B 17/14
                                                        348/375
2017/0192247 A1* 7/2017 Okuda ................. H04N 23/663

FOREIGN PATENT DOCUMENTS

JP       H11281879 A     10/1999
JP       2000056214 A     2/2000
JP       2006319824 A    11/2006
JP       2015099216 A     5/2015
JP       2019090952 A     6/2019
JP       2019091027 A     6/2019
JP       2021117415 A     8/2021

* cited by examiner

*Primary Examiner* — Noam Reisner
(74) *Attorney, Agent, or Firm* — ROSSI, KIMMS & McDOWELL LLP

(57) ABSTRACT

A control apparatus for use with a camera system that includes an image pickup apparatus that includes an image sensor, and a lens an apparatus that includes at least one optical element configured to change at least one of a tilt effect that tilts a focal plane relative to an imaging plane of the image sensor and a shift effect that moves an imaging range includes a first control unit configured to move, in response to a first operation instruction based on an operation to an operation unit, the at least one optical element according to the operation, and a second control unit configured to move the at least one optical element to a preset position in response to a second operation instruction different from the first operation instruction.

12 Claims, 6 Drawing Sheets

CONTROL APPARATUS, LENS APPARATUS, IMAGE PICKUP APPARATUS, AND CAMERA SYSTEM

BACKGROUND

Technical Field

One of the aspects of the disclosure relates to a control apparatus, a lens apparatus, an image pickup apparatus, and a camera system.

Description of the Related Art

Japanese Patent Laid-Open No. ("JP") 2019-090952 discloses an optical system that moves two optical element units in a direction orthogonal to an optical axis for tilt imaging that adjusts an in-focus range and shift imaging that changes an imaging angle of view and corrects distortion. Recently, the tilt imaging and the shift imaging have more frequently been used, and a laborsaving and timesaving operation is urgently demanded in this imaging. However, JP 2019-090952 is silent about the laborsaving and time-saving operation.

SUMMARY

One of the aspects of the embodiment provides a control apparatus that can provide a laborsaving and timesaving operation to facilitate tilt imaging and shift imaging.

A control apparatus according to one aspect of the disclosure for use with a camera system that includes an image pickup apparatus that includes an image sensor, and a lens an apparatus that includes at least one optical element configured to change at least one of a tilt effect that tilts a focal plane relative to an imaging plane of the image sensor and a shift effect that moves an imaging range includes a first control unit configured to move, in response to a first operation instruction based on an operation to an operation unit, the at least one optical element according to the operation, and a second control unit configured to move the at least one optical element to a preset position in response to a second operation instruction different from the first operation instruction. A lens apparatus, an image pickup apparatus, and a camera system also constitute another aspect of the disclosure.

Further features of the disclosure will become apparent from the following description of embodiments with reference to the attached drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

DESCRIPTION OF THE EMBODIMENTS

Figure 1A:
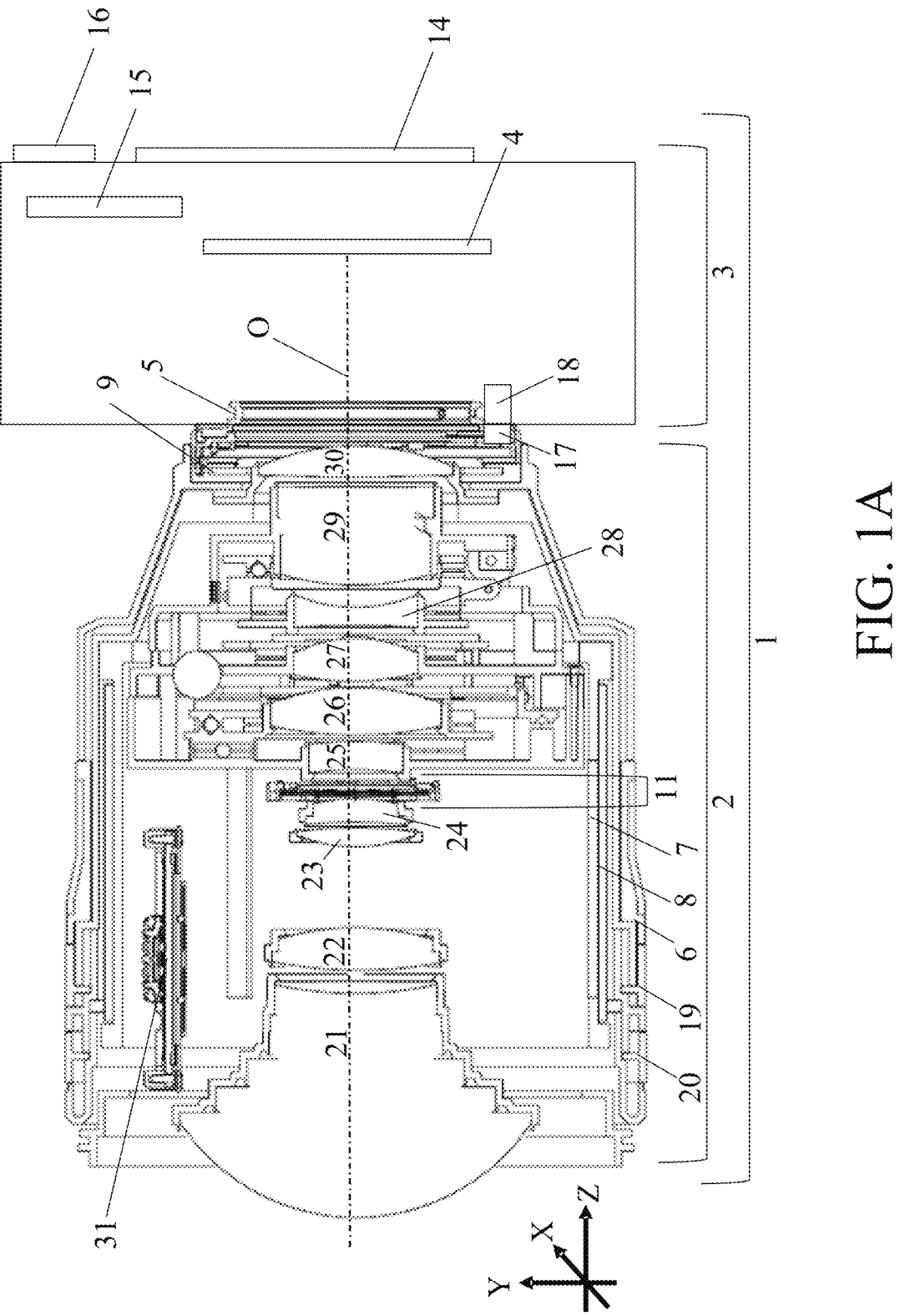
FIGS. 1A and 1B are sectional views of a camera system according to this embodiment.

Referring now to the accompanying drawings, a detailed description will be given of embodiments according to the disclosure. Corresponding elements in respective figures will be designated by the same reference numerals, and a duplicate description thereof will be omitted.

FIG. 1A is a sectional view of a camera system 1 according to this embodiment. The camera system 1 includes a lens barrel (lens apparatus) 2 and a camera (image pickup apparatus) 3. The lens barrel 2 and the camera 3 are connected via a mount 5 provided to the lens barrel 2 and an unillustrated mount provided to the camera 3, and communicate with each other via a lens-side communication unit 17 provided to the lens barrel 2 and a camera-side communication unit 18 provided to the camera 3. The lens-side communication unit 17 and the camera-side communication unit 18 include contacts for supplying power from the camera 3 to the lens barrel 2. In this embodiment, a Y-axis direction is a vertical direction (gravity direction) in FIG. 1A, a Z-axis direction is a direction parallel to an optical axis O of an optical system included in the lens barrel 2, and an X-axis direction is a direction orthogonal to the Y-axis direction and the Z-axis direction.

The camera 3 includes an image sensor 4, a display unit 14, a camera-side CPU (camera CPU hereinafter) 15, and a viewfinder 16. Controlling an unillustrated shutter through the camera CPU 15 can expose and captures an image formed through the lens barrel 2 to the image sensor 4 at an arbitrary time. The display unit 14 displays the captured image and a setting screen for changing a variety of settings of the camera system 1. In this embodiment, the display unit 14 includes a touch panel. Viewing the viewfinder 16, a photographer (user) can confirm the captured image and input a visual line (line of sight).

The lens barrel 2 includes an optical system, a zoom operation ring (zoom ring hereinafter) 6, a guide cylinder 7, a cam cylinder 8, a lens-side CPU (lens CPU hereinafter) 9, an aperture stop mechanism 11, a focus operation ring (focus ring hereinafter) 19, and an aperture stop operation ring (aperture ring hereinafter) 20.

The optical system includes a first lens unit 21, a second lens unit 22, a third lens unit 23, a fourth lens unit 24, a fifth lens unit 25, a sixth lens unit 26, a seventh lens unit 27, an eighth lens unit 28, a ninth lens unit 29, and a tenth lens unit

30. This embodiment moves at least one lens (optical element) included in the optical system and changes at least one of a tilt effect that tilts a focal plane relative to the imaging plane of the image sensor 4 and a shift effect that shifts an imaging range. Each lens unit is held by a barrel having cam followers. Each cam follower is engaged with a linear groove provided in the guide cylinder 7 parallel to the optical axis O and/or a groove tilted to the optical axis O provided in the cam cylinder 8. As the zoom ring 6 is rotated, the cam cylinder 8 is rotated and a positional relationship among the lens units is changed in the Z-axis direction. Thereby, the focal length of the lens barrel 2 is varied. The focal length of the lens barrel 2 can be detected by an unillustrated zoom position detector that detects a rotating amount of the zoom ring 6. The lens CPU 9 changes an aperture diameter of the optical system by controlling the aperture stop mechanism 11. The photographer can designate the aperture diameter using the aperture ring 20, the display unit 14, or the like.

The second lens unit 22 is a focus unit (focus member) that moves in the Z-axis direction during focusing. The photographer can designate a focus position using the focus ring 19. The lens CPU 9 changes the focus position by controlling the second lens unit 22 via a vibration actuator 31 using a signal from an unillustrated detector that detects a rotation amount of the focus ring 19. The lens CPU 9 adjusts the focus position using the focal length acquired from a zoom position detector and a moving amount of at least one lens for changing at least one of the tilt effect and the shift effect.

This embodiment can change the tilt effect and the shift effect by moving the sixth lens unit 26 and the eighth lens unit 28 in the direction orthogonal to the optical axis O. More specifically, the tilt effect can be changed by moving the sixth lens unit 26 and the eighth lens unit 28 in opposite directions, and the shift effect can be changed by moving them in the same direction. The lens CPU 9 controls the movement of the sixth lens unit 26 via a driving unit using a signal from an unillustrated detector that detects a moving amount of the sixth lens unit 26. The lens CPU 9 controls the movement of the eighth lens unit 28 via a driving unit using a signal from an unillustrated detector that detects a moving amount of the eighth lens unit 28. The driving unit for moving each of the sixth lens unit 26 and the eighth lens unit 28 is, for example, a stepping motor or a voice coil motor (VCM). The tilt effect can be changed by tilting (rotating) the lens.

Figure 1B:
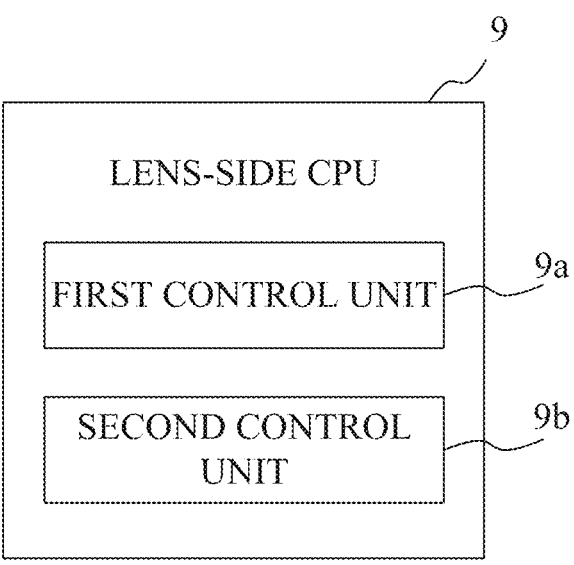

The lens CPU 9 includes a first control unit 9a and a second control unit 9b, as illustrated in FIG. 1B. The first control unit 9a moves at least one lens included in the optical system in accordance with the operation in response to a first operation instruction based on the operation of the operation unit, which will be described below. The second control unit 9b moves at least one lens included in the optical system to a preset position in response to a second operation instruction different from the first operation instruction. The lens CPU 9 is mounted inside the lens barrel 2 in this embodiment but may be configured as a control apparatus different from the lens barrel 2. Alternatively, the camera CPU 15 may serve as the first control unit 9a and the second control unit 9b.

Figures 2A, 2B, 2C:
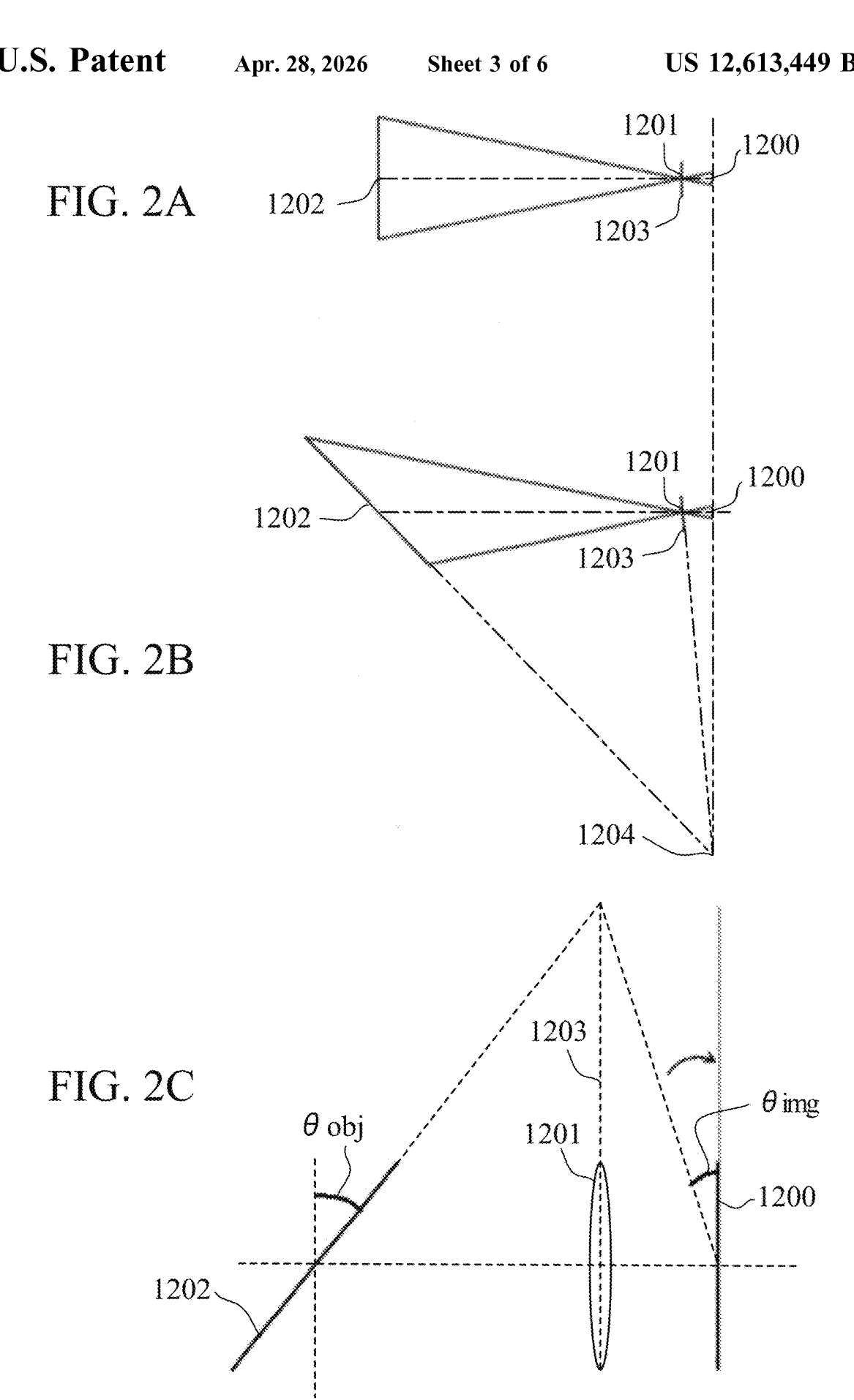
FIGS. 2A to 2C explain the Scheimpflug principle.

Referring now to FIGS. 2A to 2C, a description will be given of the Scheimpflug principle. FIG. 2A illustrates an in-focus range in a case where an optical axis illustrated by an alternate long and short dash line of an optical system 1201 is not tilted to an imaging plane 1200. FIG. 2B illustrates an in-focus range in a case where the optical axis of the optical system 1201 is tilted to the imaging plane 1200. According to the Scheimpflug principle, in a case where the imaging plane 1200 and a principal plane 1203 of the optical system intersect at an intersection 1204, as illustrated in FIG. 2B, the focused object plane 1202 passes through the intersection 1204. Therefore, in a case where the optical axis of the optical system 1201 is tilted to the imaging plane 1200, the in-focus range of the object side is determined according to the Scheimpflug principle. In a case where an object to be imaged has a depth, tilting the object plane 1202 along the depth can provide an in-focus state on the object from the near side to the far side. On the other hand, tilting the principal plane 1203 of the optical system 1201 in the direction opposite to the tilt of the object having the depth can make the object plane 1202 intersect the depth direction of the object at an angle close to a right angle. In this case, the in-focus range can be made extremely narrow, so a diorama-like image can be acquired.

This embodiment can generate a tilt $\theta$obj of the object plane 1202 without tilting the imaging plane 1200 by an image plane tilt $\theta$img, as illustrated in FIG. 2C, by utilizing the image plane tilt caused by decentering (eccentricity) of the optical system 1201. However, if the tilt $\theta$obj of the object plane 1202 is generated only by the optical system 1201, a decentering amount of the optical system 1201 increases and the composition shift increases. Accordingly, a lens designed to reduce aberration fluctuations during decentering may be decentered. In order to change the tilt effect, this embodiment decenters the sixth lens unit 26 that tilts the object plane and the eighth lens unit 28 that reduces the aberration fluctuations during decentering.

A description will be given of an operating method of the operation unit that changes the tilt effect and the shift effect according to this embodiment.

Figure 3:
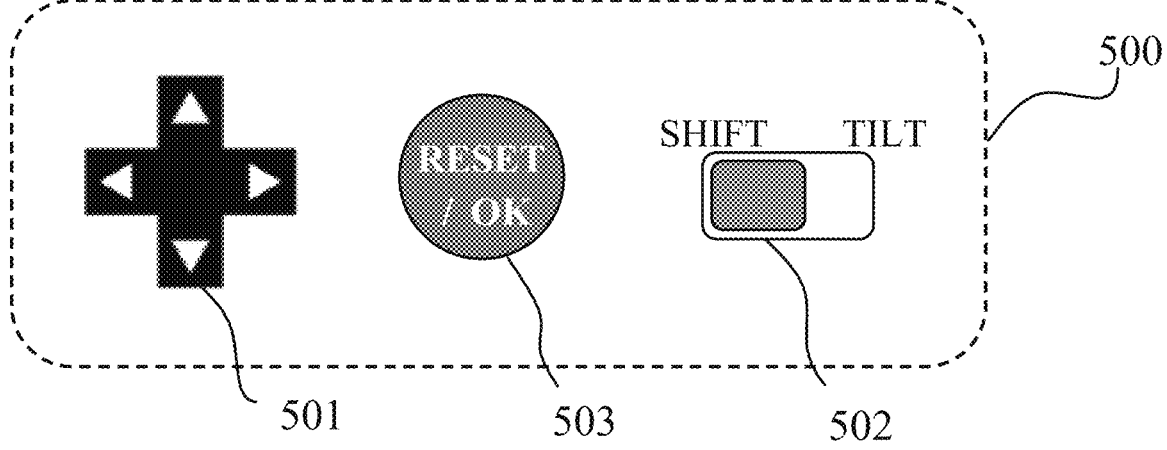
FIG. 3 explains an example of an operation unit.

FIG. 3 explains an operation unit 500 for changing the tilt effect and the shift effect. The operation unit 500 includes an arrow key (cursor key or direction key) 501, a slide switch (selection unit) 502, and a reset/OK (cancel/select) button 503. The operation unit 500 is provided to the lens barrel 2 operably by the photographer. The operation unit 500 is provided in the lens barrel 2 in this embodiment, but may be provided to the camera 3. Part of the operation unit 500 (such as the arrow key 501) may be provided to the lens barrel 2, and the remaining part (such as the reset/OK button 503) may be provided to the camera 3. Instead of the arrow key 501, an operation member such as a joystick, a lever, an operation ring, or the like may be used. Instead of the operation unit 500, for example, a functional screen similar to the operation unit 500 may be displayed on the display unit 14. The functions of the operation unit 500 may be assigned to existing operation members provided to the camera system 1.

A description will now be given of the operation of the photographer in the tilt imaging to obtain the tilt effect. First, the photographer operates the zoom ring 6 to determine a desired composition. At this time, the camera system 1 may be fixed to a tripod or may be hand-held. Next, the photographer operates the aperture ring 20 using the captured image displayed on the display unit 14 or the viewfinder 16 to properly adjust the exposure. The photographer operates the focus ring 19 during focusing to focus on the object. The exposure and focus may be automatically controlled by the camera CPU 15, for example, instead of manual control.

Figures 4A, 4B, 4C, 4D, 4E:
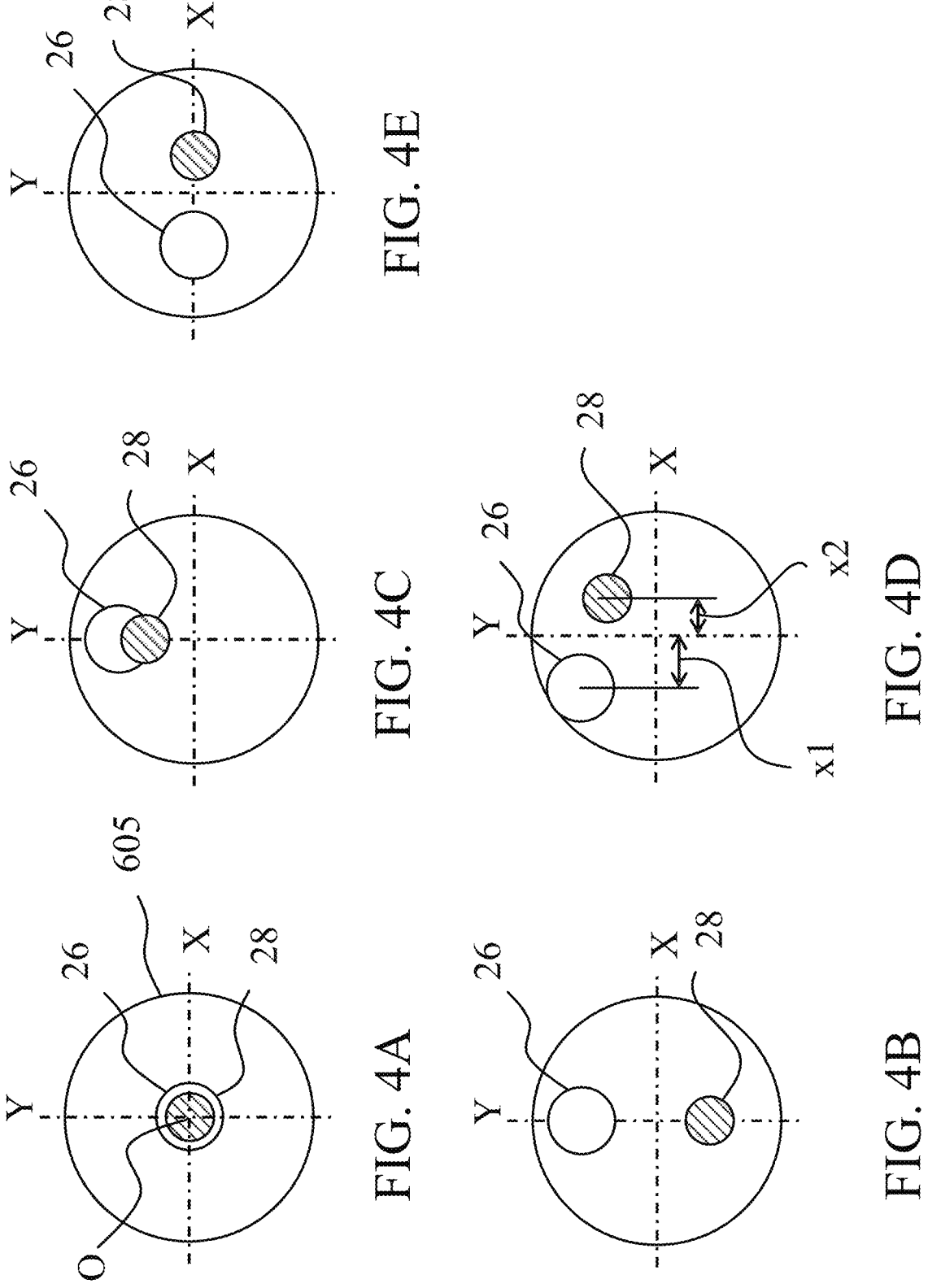
FIGS. 4A to 4E illustrate the positions of a sixth lens unit and an eighth lens unit viewed from a direction orthogonal to an optical axis.

Next, the photographer slides a slide switch 502 to a "TILT" side (tilt imaging side). In the state (initial state) before the tilt imaging is performed, the sixth lens unit 26 and the eighth lens unit 28 are located on the optical axis O, as illustrated in FIG. 4A. In FIGS. 4A to 4E, assume that the sixth lens unit 26 and the eighth lens unit 28 are movable in a moving range 605.

Next, the photographer operates the arrow key 501 to adjust the direction and amount of the tilt effect. More specifically, the tilt effect direction is adjusted to a direction indicated by a pressed arrow of the arrow key 501, and the tilt effect amount is adjusted by an operation amount such as a pressing time period and the number of presses.

For example, in a case where an up arrow of the arrow key 501 is pressed, the focus position of the upper part of the screen can be moved to the back side, and the focus position of the lower part of the screen can be moved to the front side. Thereby, if there are a long-distance object at the top of the screen and a short-distance object at the bottom of the screen, both objects can be in focus (forward tilt). At this time, as illustrated in FIG. 4B, the sixth lens unit 26 and the eighth lens unit 28 are respectively moved upward and downward in the Y-axis direction from the positions illustrated in FIG. 4A. The moving amounts of the sixth lens unit 26 and the eighth lens unit 28 are determined by the design and optical state of the optical system.

In a case where a down arrow of the arrow key 501 is pressed, the focus position at the upper part of the screen can be moved to the front side and the focus position at the lower part of the screen can be moved to the back side. Thereby, if there are a short-distance object at the top of the screen and a long-distance object at the bottom of the screen, both objects can be in focus (reverse tilt). At this time, the sixth lens unit 26 and the eighth lens unit 28 are respectively moved downward and upward in the Y-axis direction from the positions illustrated in FIG. 4A.

The photographer can check whether the set tilt effect is as intended using the display unit 14 and/or the viewfinder 16.

After the tilt effect adjustment is completed, the photographer operates an unillustrated release switch to capture an image on the image sensor 4. The captured image is stored in a memory or the like. The photographer can check the captured image using the display unit 14 and/or the viewfinder 16.

In a case where the intended tilt imaging has been performed, the photographer may end the operation. Alternatively, for example, in order to compare images with and without the tilt effect, the photographer may attempt to capture an image without the tilt effect (while the tilt setting is turned off). Accordingly, a description will now be given of an operation of the photographer who attempts to capture an image while the tilt setting is turned off.

The photographer operates the reset/OK button 503. In a case where the reset/OK button 503 is operated, the lens CPU 9 moves the sixth lens unit 26 and the eighth lens unit 28 to preset positions (the positions illustrated in FIG. 4A, that is, the initial positions in this embodiment). Thereby, the tilt setting is turned off. Next, the photographer can operate the release switch to capture an image while the tilt setting is turned off.

This embodiment turns off the tilt setting by operating the reset/OK button 503, but is not limited to this example. For example, the tilt setting may be turned off by a specific operation different from a normal operation to the arrow key 501.

A description will now be given of an operation of the photographer who attempts to perform the shift imaging for obtaining the shift effect. As in the case of the tilt imaging, the photographer first determines a composition and then sets an imaging condition. Next, the photographer slides the slide switch 502 to a "SHIFT" side (shift imaging side). In the state (initial state) before the shift imaging is performed, the sixth lens unit 26 and the eighth lens unit 28 are located on the optical axis O as illustrated in FIG. 4A.

Next, the photographer operates the arrow key 501 to adjust the direction and amount of the shift effect. More specifically, the shift effect direction is adjusted according to a direction indicated by a pressed arrow of the arrow key 501, and the shift effect amount is adjusted according to an operation amount such as a pressing time period and the number of presses.

For example, in a case where the up arrow of the arrow key 501 is pressed, the angle of view can be moved to the upper side of the screen, or the distortion of a vertical line can be corrected. Thereby, for example, the distortion can be corrected in which a building appears to taper in an architectural image (upward shift imaging). At this time, as illustrated in FIG. 4C, the sixth lens unit 26 and the eighth lens unit 28 are moved upward in the Y-axis direction from the positions illustrated in FIG. 4A. The moving amounts of the sixth lens unit 26 and the eighth lens unit 28 are determined by the design and optical state of the optical system.

In a case where the down arrow of the arrow key 501 is pressed, the angle of view can be moved to the lower side of the screen. At this time, the sixth lens unit 26 and the eighth lens unit 28 are moved downward in the Y-axis direction from the positions illustrated in FIG. 4A.

The photographer can check whether the set shift effect is as intended using the display unit 14 and/or the viewfinder 16.

After the shift effect adjustment is completed, the photographer operates the unillustrated release switch to capture an image onto the image sensor 4. The captured image is stored in a memory or the like. The photographer can check the captured image using the display unit 14 and/or the viewfinder 16.

In a case where the intended shift imaging has been performed, the photographer may end the operation. Alternatively, for example, in order to compare images with and without the shift effect, the photographer may attempt to capture an image without the shift effect (while the shift setting is turned off). Accordingly, a description will be given of an operation of the photographer who attempts to capture an image while the shift setting is turned off.

The photographer operates the reset/OK button 503. In a case where the reset/OK button 503 is operated, the lens CPU 9 moves the sixth lens unit 26 and the eighth lens unit 28 to preset positions (the positions illustrated in FIG. 4A, that is, the initial positions in this embodiment). Thereby, the shift setting is turned off. Next, the photographer can operate the release switch to capture an image while the shift setting is turned off.

This embodiment turns off the shift setting by operating the reset/OK button 503, but is not limited to this example. For example, the shift setting may be turned off by a specific operation different from a normal operation to the arrow key 501.

A description will now be given of an operation of the photographer who attempts to perform imaging for obtaining both the tilt effect and the shift effect. In this embodiment, the tilt effect is adjusted after the shift effect is adjusted. The photographer first determines a composition and then sets an imaging condition. Next, the photographer slides the slide switch 502 to the "SHIFT" side (shift imaging side). In the state (initial state) before the shift imaging is performed, the sixth lens unit 26 and the eighth lens unit 28 are located on the optical axis O as illustrated in FIG. 4A.

Next, the photographer operates the arrow key 501 to adjust the direction and amount of the shift effect. More specifically, the shift effect direction is adjusted according to a direction indicated by a pressed arrow of the arrow key 501, and the shift effect amount is adjusted according to an operation amount such as a pressing time period and the number of presses.

For example, in a case where the up arrow in the arrow key 501 is pressed, the angle of view can be moved to the upper side of the screen, or the distortion of the vertical line can be corrected. Thereby, for example, the distortion can be corrected in which a building appears to taper in an architectural image (upward shift imaging). At this time, as illustrated in FIG. 4C, the sixth lens unit 26 and the eighth lens unit 28 are moved upward in the Y-axis direction from the positions illustrated in FIG. 4A. The moving amounts of the sixth lens unit 26 and the eighth lens unit 28 is determined by the design and optical state of the optical system. The photographer can check whether the set shift effect is as intended using the display unit 14 and/or the viewfinder 16.

Next, the photographer adjusts the tilt effect while maintaining the shift effect. The photographer first slides the slide switch 502 to the "TILT" side (tilt imaging side). Before the tilt effect is adjusted, the sixth lens unit 26 and the eighth lens unit 28 are located at positions illustrated in FIG. 4C.

Next, the photographer operates the arrow key 501 to adjust the direction and amount of the tilt effect. More specifically, the tilt effect direction is adjusted to a direction indicated by a pressed arrow of the arrow key 501, and the tilt effect amount is adjusted by an operation amount such as a pressing time period and the number of presses. For example, in a case where a left arrow in the arrow key 501 is pressed, the focus position at the left side of the screen can be moved to the back side, and the focus position at the right side of the screen can be moved to the front side. Thereby, if there are a long-distance object on the left side of the screen and a short-distance object on the right side of the screen, both objects can be in focus (forward tilt). At this time, as illustrated in FIG. 4D, the sixth lens unit 26 and the eighth lens unit 28 are respectively moved leftward and rightward in the X-axis direction from the positions illustrated in FIG. 4C. The photographer can check whether the set tilt effect is as intended using the display unit 14 and/or the viewfinder 16.

After the adjustments of the shift effect and the tilt effect are completed, the photographer operates the unillustrated release switch to capture an image onto the image sensor 4. The captured image is stored in a memory or the like. The photographer can check the captured image using the display unit 14 and/or the viewfinder 16. At this time, the tilt setting and shift setting are turned on.

A description will now be given of the way of turning off the tilt setting and the shift setting. In this embodiment, the tilt setting is turned off and then the shift setting is turned off.

The photographer first slides the slide switch 502 to the "TILT" side (tilt imaging side). Next, the photographer operates the reset/OK button 503. In a case where the reset/OK button 503 is operated, the lens CPU 9 moves the sixth lens unit 26 and the eighth lens unit 28 to preset positions. In this embodiment, the sixth lens unit 26 and the eighth lens unit 28 are moved from the positions illustrated in FIG. 4D to the preset positions (the positions illustrated in FIG. 4C, that is, the positions where the shift effect is maintained in this embodiment). Thereby, the tilt setting is turned off. Next, the photographer can operate the release switch to capture an image while the tilt setting is turned off and the shift setting is turned on.

Next, the photographer slides the slide switch 502 to the SHIFT side (shift imaging side). Next, the photographer operates the reset/OK button 503. In a case where the reset/OK button 503 is operated, the lens CPU 9 moves the sixth lens unit 26 and the eighth lens unit 28 to preset positions. In this embodiment, the sixth lens unit 26 and the eighth lens unit 28 are moved from the positions illustrated in FIG. 4C to the preset positions (the positions illustrated in FIG. 4A, that is, the initial positions). Thereby, the shift setting is turned off. Next, the photographer can operate the release switch to capture an image while both the tilt setting and the shift setting are turned off.

The movements of the sixth lens unit 26 and the eighth lens unit 28 will be summarized below in turning on and off both the tilt setting and the shift setting in this embodiment. In acquiring both the tilt effect and the shift effect, the sixth lens unit 26 and the eighth lens unit 28 are moved from the initial positions (positions in FIG. 4A) where the tilt setting and the shift setting are turned off to the positions (positions in FIG. 4C) where only the shift setting is turned on). Next, the sixth lens unit 26 and the eighth lens unit 28 are moved to the positions where the tilt setting and the shift setting are turned on (the positions illustrated in FIG. 4D). In turning off both the tilt setting and the shift setting, the sixth lens unit 26 and the eighth lens unit 28 are moved from the positions where the tilt setting and shift setting are turned on (positions illustrated in FIG. 4D) to the positions where the tilt setting is turned off (positions illustrated in FIG. 4C). Next, the sixth lens unit 26 and the eighth lens unit 28 are moved to the initial positions (the positions in FIG. 4A) where both the tilt setting and the shift setting are turned off.

In turning off both the tilt setting and the shift setting, this embodiment turns off the shift setting after turning off the tilt setting, but may turn off the tilt setting after turning off the shift setting. In this case, the sixth lens unit 26 and the eighth lens unit 28 are moved from the position illustrated in FIG. 4D to the positions where the tilt setting is turned on and the shift setting is turned off (positions illustrated in FIG. 4E).

A description now will be given of an example of a method of acquiring the moving amounts of the sixth lens unit 26 and the eighth lens unit 28 in a case where the state of FIG. 4D transfers to the state of FIG. 4C. In FIG. 4D, assume that an X-axis coordinate of the sixth lens unit 26 is x1, and an X-axis coordinate of the eighth lens unit 28 is x2. The coordinate (information about the position) of each lens unit is detected by a detector that detects the moving amount of each lens unit. In the tilt setting, the moving amount in the X-axis direction of the eighth lens unit 28 can be expressed as axT, where xT is a moving amount in the X-axis direction of the sixth lens unit 26, and "a" is a ratio of a unit moving amount of the eighth lens unit 28 to a unit moving amount of the sixth lens unit 26. That is, in the tilt setting, in a case where the sixth lens unit 26 is moved by 1 mm, the eighth lens unit 28 is moved by "a" mm.

In the shift setting, a moving amount in the X-axis direction of the eighth lens unit 28 can be expressed as bxS, where xS is a moving amount in the X-axis direction of the sixth lens unit 26, and "b" is a ratio of a unit moving amount of the eighth lens unit 28 to a unit moving amount of the sixth lens unit 26. That is, in the shift setting, in a case where the sixth lens unit 26 is moved by 1 mm, the eighth lens unit 28 is moved by "b" mm.

The coordinates x1 and x2 are represented by the following equations (1) and (2), respectively:

$$x1 = xT + xS \qquad (1)$$

$$x2 = axT + bxS \qquad (2)$$

From equations (1) and (2), the moving amount xS is expressed by the following equation (3):

$$xS = (ax1 - x2)/(a - b) \qquad (3)$$

The moving amount xT is expressed by the following equation (4):

$$xT = x1 - xS \qquad (4)$$

By similar calculations in the Y-axis direction, the moving amounts of the sixth lens unit 26 and the eighth lens unit 28 in each of the tilt setting and the shift setting can be acquired. The values "a" and "b" are common to those in acquiring the moving amounts in the X-axis direction.

As described above, the moving amounts of the sixth lens unit 26 and the eighth lens unit 28 can be acquired in each of the tilt setting and the shift setting using the detection result by the detector that detects the moving amount of each lens unit. Thereby, the sixth lens unit 26 and the eighth lens unit 28 are movable from the positions illustrated in FIG. 4D to the positions illustrated in FIG. 4C. That is, it is possible to turn off the tilt setting and turn on the shift setting.

Similarly, the moving amounts of the sixth lens unit 26 and the eighth lens unit 28 can be acquired in a case where the state of FIG. 4D transfers to the state of FIG. 4E where the tilt setting is turned on and the shift setting is turned off. Even in a case where the tilt setting and the shift setting are repeated multiple times, the total moving amount in the tilt setting and the total moving amount in the shift setting can be acquired by this method.

The ratios "a" and "b" of the moving amount of the eighth lens unit 28 to the moving amount of the sixth lens unit 26 during the tilt setting and the shift setting are determined by the optical condition and can often be treated as constants. The values "a" and "b" can sometimes be represented by simple equations, or can be represented by tables for each condition. The optical condition is determined by the characteristics of the optical system and the camera 3, such as the focal length, the object distance, optical sensitivities of the sixth lens unit 26 and the eighth lens unit 28, the aperture diameter, and the resolution of the image sensor 4.

A description will now be given of another example of the way of acquiring the moving amounts of the sixth lens unit 26 and the eighth lens unit 28 in a case where the state of FIG. 4D transfers to the state of FIG. 4C. Whenever the lens CPU 9 moves the sixth lens unit 26 and the eighth lens unit 28 during the tilt setting and the shift setting, information about each moving amount for each of the tilt setting and the shift setting is stored in an unillustrated memory in either the lens barrel 2 or the camera 3. Thereby, information about the total moving amounts of the sixth lens unit 26 and the eighth lens unit 28 during the tilt setting and the shift setting can be stored. In a case where the reset/OK button 503 is operated in this state, one of the tilt setting and the shift setting can be turned off using the information on the total moving amounts stored in the memory.

The memory may store a moving amount for each operation instead of the total moving amount of each lens unit in each of the tilt setting and the shift setting. In this case, if the reset/OK button 503 is operated after the tilt setting and the shift setting are alternately performed a plurality of times, the last state before the setting is restored, and if the reset/OK button 503 is further operated, the one before the last state is restored. Operating the reset/OK button 503 the number of operations of the tilt setting and the shift setting operations can finally restore the initial state.

In turning off both the tilt setting and the shift setting, this embodiment turns off one of the tilt setting and the shift setting and then turns off the other. The tilt setting and the shift setting may be turned off at the same time regardless of the slide switch 502. In this case, the sixth lens unit 26 and the eighth lens unit 28 may be moved from the positions illustrated in FIG. 4D directly to the positions illustrated in FIG. 4A. In a case where the reset/OK button 503 is operated, the tilt setting and the shift setting may be changed to the preset states instead of simultaneously turning off the tilt setting and the shift setting (initial state). In this case, the sixth lens unit 26 and the eighth lens unit 28 may be moved to the pre-stored positions, or may be moved to positions acquired using the pre-stored set values (directions and moving amounts). The pre-stored position includes, for example, a position for canceling the first operation instruction, such as the initial position. The reset/OK button 503 may be used as an operation unit for storing the preset states of the tilt setting and the shift setting. In this case, the operation unit for storing the predetermined states of the tilt setting and the shift setting and the operation unit for changing the tilt setting and the shift setting to the preset states are the same. Accordingly, for example, in a case where the reset/OK button 503 is pressed twice in succession or is long pressed, the preset state may be stored, and in a case where the reset/OK button 503 is pressed only once, the state may be changed to the predetermined state. In a case where the reset/OK button 503 is pressed only once, the setting that is being selected by the slide switch 502 may be turned off. In a case where the reset/OK button 503 is pressed twice in succession or is long pressed, both the shift setting and the tilt setting may be turned off.

Figure 5:
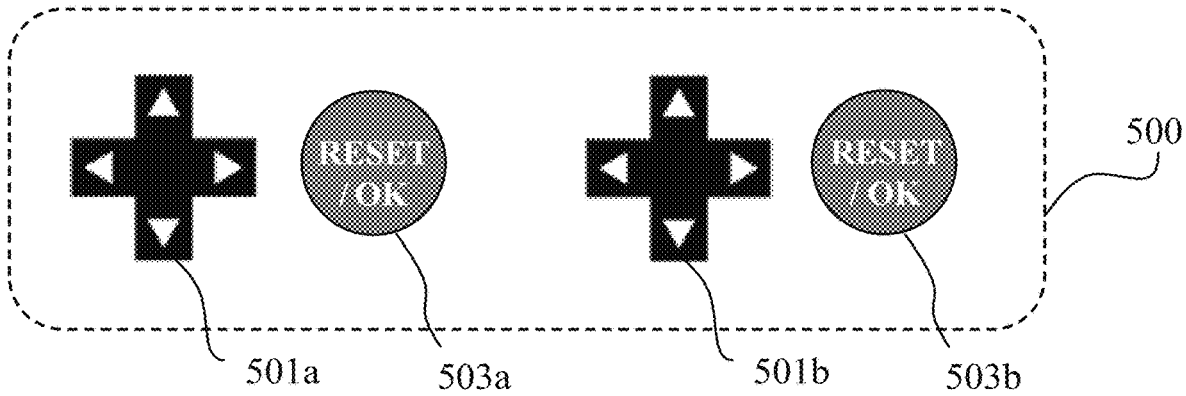
FIG. 5 explains another example of the operation unit.

In this embodiment, the operation unit 500 includes a single arrow key 501, a single slide switch 502, and a single reset/OK button 503. Alternatively, as illustrated in FIG. 5, it may include them two each. For example, the arrow key 501a and the reset/OK button 503a may be used exclusively for the tilt setting, and the arrow key 501b and the reset/OK button 503b may be used exclusively for the shift setting.

As described above, the configuration according to this embodiment can provide a laborsaving and timesaving operation to facilitate the tilt imaging and the shift imaging.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-040691, filed on Mar. 15, 2022, which is hereby incorporated by reference herein in its entirety.

What is claimed is:

1. A control apparatus for use with a camera system that comprises an image pickup apparatus including an image sensor, and an optical apparatus including first and second optical elements configured to move for at least one of tilt imaging or shift imaging, the control apparatus comprising:

a first control unit configured to move the first and second optical elements in a direction orthogonal to an optical axis of the optical apparatus for the at least one of the tilt imaging or the shift imaging, in response to a first instruction based on a first operation to an operation unit; and a second control unit configured to move the first and second optical elements in the direction to a preset position in response to a second instruction different from the first instruction, wherein the first control unit is configured to move the first and second optical elements in opposite directions to each other in the direction for the tilt imaging, and move the first and second optical elements in a same direction in the direction for the shift imaging.

2. The control apparatus according to claim 1, wherein the first control unit is configured to tilt a focal plane of the optical apparatus relative to the optical axis in the tilt imaging, and shift the focal plane to a front direction in the shift imaging, by moving the first and second optical elements.

3. The control apparatus according to claim 1, wherein the preset position is based on information about a moving amount of at least one of the first and second optical elements acquired using information about a position of the at least one of the first and second optical elements after the first control unit moves the at least one of the first and second optical elements.

4. The control apparatus according to claim 3, wherein the preset position is based on the information about the moving amount of the at least one of the first and second optical elements acquired using the information about the position of the at least one of the first and second optical elements and a ratio of a unit moving amount of the second optical element to a unit moving amount of the first optical element.

5. The control apparatus according to claim 1, wherein the preset position is based on information about a plurality of moving amounts of at least one of the first and second optical elements acquired whenever the first control unit moves the at least one of the first and second optical elements.

6. The control apparatus according to claim 1, wherein the second control unit is configured to change at least one of a tilt amount in the tilt imaging or a shift amount in the shift imaging, by moving the first and second optical elements.

7. The control apparatus according to claim 1, wherein the preset position is a position where at least one of the tilt imaging and the shift imaging cannot be performed.

8. The control apparatus according to claim 7, wherein the at least one of the tilt imaging and the shift imaging is selected by a selection unit.

9. The control apparatus according to claim 1, wherein the preset position of each of the first and second optical elements is a position on the optical axis.

10. An optical apparatus comprising: the control apparatus according to claim 1; and the first and second optical elements.

11. An image pickup apparatus comprising: the control apparatus according to claim 1; and the image sensor.

12. A system comprising: the optical apparatus according to claim 10; and the image sensor.

* * * * *